Oct. 31, 1961  E. C. EHLKE  3,006,373
AUTOMATIC MODULATING CONTROL VALVES
Filed May 27, 1960
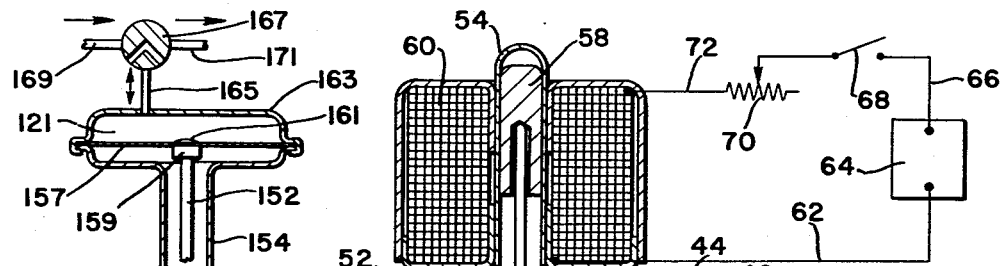
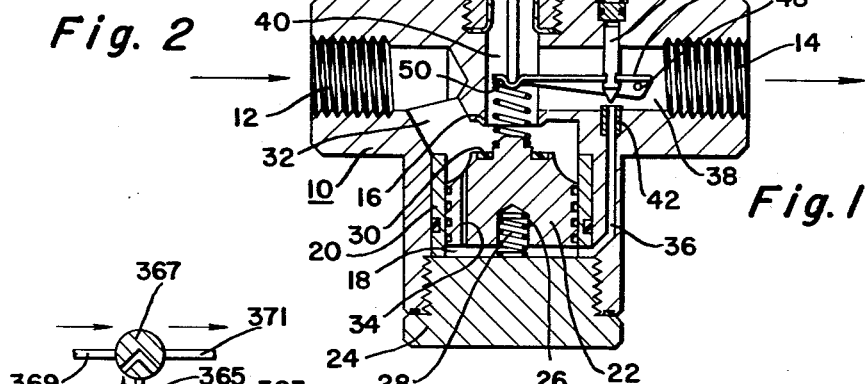
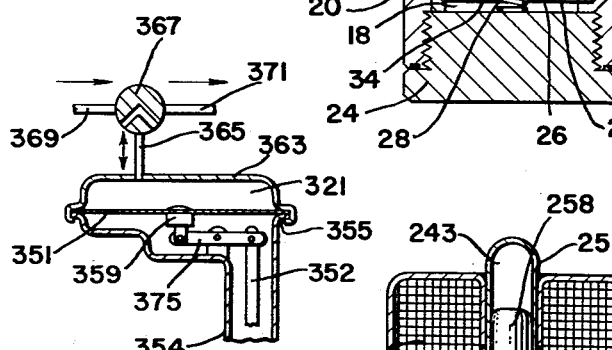
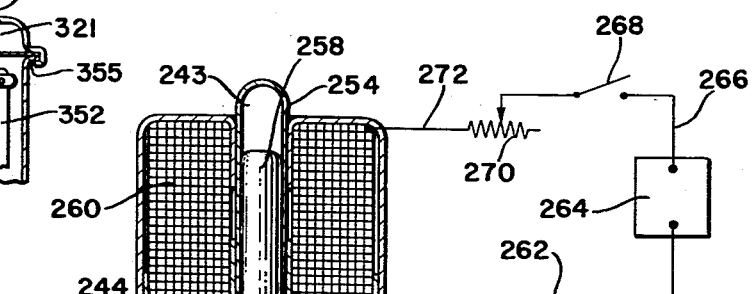
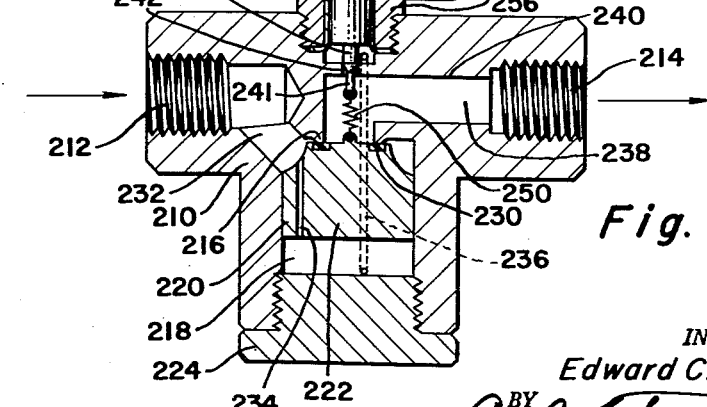
INVENTOR.
Edward C. Ehlke
BY Carl A. Sticke
His Attorney

United States Patent Office 3,006,373
Patented Oct. 31, 1961

3,006,373
AUTOMATIC MODULATING CONTROL VALVES
Edward C. Ehlke, Brookfield, Wis., assignor to General Motors Corporation, Detroit, Mich., a corporation of Delaware
Filed May 27, 1960, Ser. No. 32,209
7 Claims. (Cl. 137—623)

This invention pertains to automatic modulating control valves and especially to electrically controlled valves which may be modulated to vary the rate of flow over wide limits.

Electrically controlled valves, such as solenoid valves, are normally held in either the fully open or the fully closed position. There appears to be no obvious way in which such valves can be held in various positions between the fully open and fully closed position.

It is an object of this invention to provide a valve which can be held in various positions intermediate the fully open and fully closed positions by varying the energy of an electrical operating means.

It is another object of this invention to provide an arrangement wherein the varying of the opening of a pilot valve will provide a proportional modulated position of a main valve.

These and other objects are attained in the normally open and normally closed solenoid valves shown in the drawings. In each of the valves a piston-type fluid motor is directly connected to the valve element and is spring biased to the closed position. A restricted passage from the inlet leads to the closed chamber of the fluid motor and a valve controlled passage leads from the closed chamber to the outlet of the valve. A spring connects the fluid motor and main valve with an armature and a pilot valve. In the normally open valve, a compression-type spring extends between the main valve and piston and a lever which is so connected to the pilot valve that the expansion of the compression spring tends to open the pilot valve. The compression spring and lever are also connected by a rod to the armature of the solenoid which is located so that, upon energization, the armature moves downward so as to compress the spring and to close the pilot valve. In the normally closed valve, a tension spring connects the piston and main valve to the pilot valve in such a way that the spring tends to pull both the pilot valve and the main valve to closed position. The armature is also connected to the tension spring and is located in such a way that the energization of the solenoid will pull the pilot valve to the open position and increase the tension upon the tension spring.

Further objects and advantages of the present invention will be apparent from the following description, reference being had to the accompanying drawings wherein preferred embodiments of the present invention is clearly shown.

In the drawings:

FIGURE 1 is a vertical sectional view through a normally open solenoid valve and control system embodying one form of my invention;

FIGURE 2 is a modification showing the provision of a fluid pressure control in place of a solenoid for actuating the valve;

FIGURE 3 is a vertical sectional view through a normally closed solenoid valve and control system; and FIGURE 4 is a modification showing a fluid pressure actuating system in place of a solenoid for the valve shown in FIGURE 3.

Referring now to the drawings and more particularly to FIGURE 1, there is shown a valve body 10 containing an inlet connection 12, an outlet connection 14 and a downwardly facing valve seat 16 located between the inlet and the outlet 12 and 14. Beneath the valve seat 16 is a cylindrical chamber 18 provided with a sleeve 20 within which is slidably mounted a piston 22. The cylindrical chamber 18 is closed at the lower end by a threaded cap 24. The piston 22 contains a downwardly facing recess 26 receiving the upper end of a compression-type coil spring 28 extending downwardly into contact with the threaded cap 24. This compression spring 28 normally urges the piston 22 in the upward direction so that the valve face 30 provided at the top normally is urged toward the seat 16.

The inlet 12 is provided with a passage 32 connecting with the upper portion of the piston 22 which is provided with a curved chamfer surrounding the valve face 30. A restricted passage 34 extends from the chamfered portion of the piston 22 downwardly into the closed cylindrical chamber 18 between the piston 22 and the threaded cap 24. A second and larger passage 36 extends from the chamber 18 through the side wall of the valve body up to the outlet passage 38 extending from the passage 40 located within and above the valve seat 16 to the outlet connection 14. This passage 36 is provided with a valve seat member 42 at the outlet end where it discharges into the passage 38. A pilot valve 44 is slidably mounted directly above the valve seat 42 in the valve body 10. It is normally held upward in the open position by the lifting force of the compression spring 50 upon the end of the pilot valve lever 46 pivoted upon the pin 48 within the valve body 10.

The wall of valve seat 16 extends upwardly around the passage 40 for separating the passage 40 from the inlet 12 and its connecting passage 32. The top of the piston 22 within the main valve element 30 has a spring seat upon which rests the compression-type coil spring 50. Resting on the top of this compression-type coil spring is a spring seat upon the adjacent end of the lever 46. This spring seat has a central depression which receives the lower end of the actuating pin 52 extending upwardly through a sleeve 54 of nonmagnetic material which is substantially coaxial with the passage 40. This sleeve 54 is closed at its upper end and is fastened at its outwardly flanged lower end into the valve body 10 by the threaded gland member 56. At the upper end of the rod 52 within the closed sleeve 54 is the armature 58 having a recess in its bottom half for receiving the pin 52. This armature is slidably mounted within the closed sleeve 54 and the pin 52 is long enough so that it holds this armature 58 above the electromagnet coil 60 which surrounds the closed sleeve 54. One end of electromagnet coil 60 is connected by the conductor 62 to one terminal of the power supply 64 which is preferably of the direct current type. The other terminal of the power supply is connected through the conductor 66 to a manual switch 68 which in turn is connected through the variable resistance 70 and the conductor 72 to the other terminal of the electromagnet coil 60.

When the switch 68 is in the open position, the electromagnet coil 60 is deenergized and the armature 58 will be in its uppermost position. The spring 50 will be in its expanded form so as to hold the pilot valve 44 in a completely open position. The flow of fluid into the inlet 12 will provide a pressure which extends through the passage 32 onto the upper face of the piston 22 surrounding the valve face 30. The excess pressure in the inlet 12 will force the flow of fluid through the restricted passage 34 into the closed chamber 18. The wide opening of the valve 44 will allow free flow out of the chamber 18 through the passage 36 to the passage 38 connecting with the outlet 14. This pressure condition on the piston 22 will force it to the open position. The greater the pressure differential between the inlet 12 and the outlet 14, the greater will be the opening of the valve face 30 away from the valve seat 16.

When the switch 68 is closed, the energization of the electromagnet coil will be proportional to the current flowing through it. This will be determined by the adjustment of the variable resistance 70. If the variable resistance 70 is adjusted to provide low current flow, the amount of downward pull by the coil 60 upon the armature 58 will be small. This will tend to turn the lever 46 in a counterclockwise direction and slightly compress the spring 50. This will also tend to provide a slight increase in the downward force upon the piston 22. However, this slight increase in downward force will be overcompensated by the downward movement and position of the pilot valve 44 which now will restrict to a small extent the flow of fluid out of the passage 36 at the valve seat 42. This will increase the pressure within the chamber 18 to allow a small increase in force on the bottom of the piston 22 thereby changing the equilibrium conditions so that, in order to achieve equilibrium, the piston 22 must move upwardly extending the spring 28 and reducing its force so as to bring the valve face 30 closer to the valve seat 16 to modulate or further restrict the flow of fluid through the valve body 10.

By moving the tap on the variable resistance 70 to the left, a greater current flow through the coil 60 will take place thereby providing a greater downward pull upon the armature 58 to move the lever 46 down further in the counterclockwise direction to move the pilot valve 44 closer to the seat 42 to further throttle the flow of fluid through the passage 36. This downward movement will also slightly increase the tension of the spring 50 but this will be more than compensated for by the increase in pressure within the chamber 18. The increase in pressure in the chamber 18 will reduce the differential between the top and bottom sides of the piston 22 so as to cause the piston to move upwardly under the force of the spring 28 until a new equilibrium condition is attained. This will cause the face 30 of the valve to move closer to the seat 16 to further throttle the flow through the valve body 10. In this form, the position of the valve face 30 away from the seat 16 is an inverse function of the voltage applied to the solenoid coil 60.

When the variable resistance 70 is adjusted to provide sufficient current flow through the coil 60, the armature 58 will be pulled downwardly with sufficient force to move the pilot valve 44 against the seat 42 to close the mouth of the passage 36. This will allow sufficient fluid to flow through the restricted passage 34 to equalize the pressure between the chamber 18 and the passage 32. This will allow the spring 28 to move the piston 22 upwardly until the valve face 30 contacts the valve seat 16 to close the valve body 10. The force upon the piston 22 in the closed position is the differential in pressure between the inlet and outlet upon the area within the valve seat 16.

In FIGURE 2 there is shown a modification in which a fluid motor having a fluid expansible chamber 121 is substituted for the solenoid 60 and the armature 58. This includes a sleeve 154 corresponding to the sleeve 54 and a pin 152 corresponding to the pin 52. The sleeve 154 is provided with an enlarged outer end provided with a flange 155 to which is sealed a diaphragm 157 having a follower 159 attached to its central portion provided with a threaded connection with the pin 152. The follower 159 may be attached to the diaphragm 157 by a rivet 161. A cap member 163 extends over the diaphragm 157 and is sealed to the flanges 155 to enclose the chamber 121. The chamber 121 is connected through a conduit 165 with the three-way valve 167 provided with a pressure supply connection 169 and an exhaust or vacuum connection 171. By this arrangement, the three-way valve 167 may be manipulated so as to vary the pressure within the chamber 121 so as to adjust the position of the pin 152 to vary the position of the lever 46 and the pilot valve 44 in the same manner as is accomplished by the electromagnet coil 60 and the armature 58.

Referring now more particularly to the normally closed solenoid valve illustrated in FIGURE 3, there is shown a valve body 210 provided with an inlet passage 212, an outlet passage 214, a valve seat 216, a passage 232, a cylindrical portion 220, a closed chamber 218, a threaded cap 224 and a piston 222. These correspond generally to the parts shown in FIGURE 1 with 200 being added to the corresponding reference characters in FIGURE 3. The piston 222 contains a restrictor passage 234 which corresponds to the restrictor passage 34 in FIGURE 1. However, no spring corresponding to the spring 28 is provided. The piston 222 is provided with a valve face 230 which forms the main valve of the valve system. Instead of the compression spring 50, there is provided a tension spring 250 within the inner end of the outlet passage 240 which connects to the lower end of the stem 241 of the pilot valve 244.

The pilot valve 244 cooperates with a valve seat 242. This valve seat 242 separates the outlet passage 240 from the chamber 243 within the closed sleeve 254 containing the armature 258. A passage 236 corresponding with passage 36 of FIGURE 1 extends from the closed chamber 218 through the walls of the valve body 210 to the bottom of the chamber 243 between the valve seat 242 and the armature 258. This passage 236 is of lesser restriction than the passage 234. The sleeve 254 is connected to and sealed to the valve body 210 by a gland nut 256. Surrounding the sleeve 254 is the electromagnet coil 260 which is located above the center of the armature 258 so that, when energized, it exerts a lifting effect upon the armature 258 to move the pilot valve 244 away from the seat 242 against the tension of the spring 250. The electromagnet coil 260 is connected by the conductor 262 to one terminal of the power source 264 preferably of the direct current type having its other terminal connected by the conductor 266 to the manual control switch 268 in turn connected through a variable resistance 270 and the conductor 272 to the second terminal of the coil 260.

When the switch 268 is open, the electromagnet coil 260 is deenergized and gravity as well as the tension spring 250 cause or pull the pilot valve 244 downwardly to the closed position against its seat 242. This closes off flow through the passage 236 so that the chamber 218 which communicates through the restricted passage 234 with the passages 232 and 234 provide a means for keeping the chamber 218 at the same pressure as the inlet 212. This provides a net differential in pressure on the piston 222 equal to the difference between the inlet and outlet pressures upon the area within the valve seat 216 acting to hold the face 230 against the seat 216. This differential in pressure results from the fact that the bottom of the piston 222 is subject to the inlet pressure existing at that time in the chamber 218 beneath the piston 222 while the portion of the top of the piston 222 surrounding the valve seat 216 is subject to the inlet pressure while the portion of the piston 222 inside the valve seat 216 is subject to the pressure of the outlet 214. It is this area within the valve seat 216 exposed to the pressure of the outlet 214 which creates the differential in pressure upon the piston 222 which holds it against the valve seat 216. This is also assisted by the pull of the tension spring 250.

When the switch 268 is closed to cause a small current to flow through the electromagnet coil 260, a small upward pull is exerted upon the armature 258 to lift the pilot valve 244 a small distance away from its valve seat 242 against the tension of the spring 250. This will allow a relatively small flow of fluid to flow from the chamber 218 through the passage 236 and through the chamber 243 and the passage surrounding the pilot valve 244 and through the valve seat 242 into the passage 238 connecting with the outlet 214. Since the passage 234 is considerably more restricted than the passage 236, there will be a pressure drop across the passage 234 so that the pressure within the chamber 218 will drop considerably below the pressure at the inlet 212 and be somewhat above the pressure in the outlet passage 238. As the pilot valve 244 opens farther, an equilibrium position will be reached at which the tendency of the piston 222 to move up or down will be substantially zero. The piston 222 will then be held against the seat 216 solely by the tension of the spring 250.

As the valve 244 is opened further by increasing current flow through the coil 260, more fluid will flow through the passage 236 to further reduce the pressure within the chamber 218 causing the pressure upon the upper face of the piston 222 to become greater than the total pressure on the bottom face of this piston to force the piston 222 downwardly against the tension of the spring 250 to allow a small opening of the main valve face 230 away from its seat 216. Increased current flow provided by decreasing the resistance of the variable resistance 270 will cause further opening of the valve 244. This will provide lower pressures within the chamber 218 which will further increase the pressure differential upon the piston 222 to cause it to move open further to increase the current flow. This, however, is partially balanced by the tension of the coil spring 250 which causes the piston to hold a relatively stable position at any given current flow within the coil 260. After sufficient voltage is applied to the solenoid to open the pilot valve and to cause the main valve to open by the pressure difference, there is applied a force in the closing direction on the pilot valve which is proportional to the opening of the main valve through the connection by the tension spring 250. Through this arrangement, the main valve will open a distance that is a direct function of the applied voltage upon the coil 260. In FIGURE 1, however, the opening of the main valve face 30 is an inverse function of the voltage applied to the solenoid coil 60.

In FIGURE 4, there is shown a modification in which a closed chamber 321 is provided having a diaphragm 357 which applies a force to the diaphragm follower 359 which is connected through a reversing lever 375 with a pin 352 corresponding to the stem connecting with the pilot valve 244. The sleeve 354 is connected to the valve body 210 by the gland nut 256 in a manner similar to the sleeve 254 in FIGURE 3. The diaphragm 357 is sealed to the flange 355 by the cap 363. The chamber 321 is connected by a conduit 365 with the three-way valve 367 which is provided a pressure supply connection 369 and a vacuum or exhaust outlet connection 371. This arrangement makes it possible to apply variable pressures within the chamber 321 acting upon the diaphragm 351 to move the stem 352 upwardly a variable distance so as to apply a modulating control to the pilot valve 244 which in turn will modulate the piston 222 and the face 230 of the main valve.

The face 230 may contain a ring of neoprene or other resilient sealing material to provide a fluid-type seal. In any of the forms, the main or piston valve can be made to hold various intermediate positions between the closed position and the fully open position. In the solenoid types, this is done by controlling the current flow through the respective coils 60 and 260. The spring connection between the main valve and piston and the pilot valve and the armature provides this modulating effect.

While the embodiments of the present invention as herein disclosed, constitute preferred forms, it is to be understood that other forms might be adopted.

What is claimed is as follows:

1. A modulating solenoid valve including a valve body having an inlet and outlet, a piston within said valve body, said valve body being provided with a piston chamber for receiving said piston, said chamber having a closed end, said valve body being provided with a valve seat between said inlet and said outlet, a main valve connected to said piston and adapted to engage said valve seat to control the flow of fluid from said inlet to said outlet, a restricted fluid passage extending from the inlet to the closed end of the piston chamber, a second fluid passage of lesser restriction extending from the closed end of the piston chamber to said outlet, said valve body being provided with a stationary valve seat for said second passage, a pilot valve cooperating with said stationary valve seat for said second passage for controlling the flow of fluid through said second fluid passage, spring means providing a resilient connection between said main and pilot valves, and electromagnetic means for controlling the position of said pilot valve for positioning the main valve in proportion to its energization.

2. A modulating valve including a valve body having an inlet and an outlet, a fluid motor having a substantially closed chamber with a restricted fluid passage connecting with said inlet and located within said valve body, said valve body having a valve seat between said inlet and outlet, a main valve connected to said fluid motor and cooperating with said valve seat to control the flow of fluid from said inlet to said outlet, a second fluid passage of lesser restriction connecting said closed chamber with said outlet, said valve body being provided with a stationary valve seat for said second passage, a pilot valve cooperating with said stationary seat for said second passage for controlling the flow of fluid through said second fluid passage, means for resiliently connecting said main and pilot valves, and adjustable actuating means for varying the opening of said pilot valve for varying the opening of said main valve.

3. A modulating valve including a valve body having an inlet and an outlet, a fluid motor having a substantially closed chamber with a restricted fluid passage connecting with said inlet and located within said valve body, said valve body having a valve seat between said inlet and outlet, a main valve connected to said fluid motor and cooperating with said valve seat to control the flow of fluid from said inlet to said outlet, a second fluid passage of lesser restriction connecting said closed chamber with said outlet, said valve body being provided with a stationary valve seat for said second passage, a pilot valve cooperating with said stationary seat for said second passage for controlling the flow of fluid through said second fluid passage, means for resiliently connecting said main and pilot valves, electromagnetic means for varying the opening of said pilot valve for varying the opening of said main valve, and adjustable means for adjusting the power of said electromagnetic means.

4. A modulating valve including a valve body having an inlet and an outlet, a fluid motor having a substantially closed chamber with a restricted fluid passage connecting with said inlet and located within said valve body, said valve body having a valve seat between said inlet and outlet, a main valve connected to said fluid motor and cooperating with said valve seat to control the flow of fluid from said inlet to said outlet, a second fluid passage of lesser restriction connecting said closed chamber with said outlet, said valve body being provided with a stationary valve seat for said second passage, a pilot valve cooperating with said stationary seat for said second passage for controlling the flow of fluid through said second fluid passage, means comprising a multiplying lever and a spring for resiliently connecting said main and pilot valves, and means for varying the opening of said pilot valve for varying the opening of said main valve.

5. A modulating valve including a valve body having an inlet and an outlet, a fluid motor having a substantially closed chamber with a restricted fluid passage connecting with said inlet and located within said valve body, said valve body having a valve seat between said inlet and outlet, a main valve connected to said fluid motor and cooperating with said valve seat to control the flow of fluid from said inlet to said outlet, a second fluid passage of lesser restriction extending through said valve body connecting said closed chamber with said outlet, said valve body being provided with a stationary valve seat for said second passage, a pilot valve cooperating with said stationary seat for said second passage for controlling the flow of fluid through said second fluid passage, said main and pilot valves being independently movable in opposite directions toward their closed positions, means for resiliently connecting said main and pilot valves, adjustable actuating means for varying the opening of said pilot valve for varying the opening of said main valve in proportion to the opening of the pilot valve.

6. A modulating valve including a valve body having an inlet and an outlet, a fluid motor having a substantially closed chamber with a restricted fluid passage connecting with said inlet and located within said valve body, said valve body having a valve seat between said inlet and outlet, a main valve connected to said fluid motor and cooperating with said valve seat to control the flow of fluid from said inlet to said outlet, a second fluid passage of lesser restriction connecting said closed chamber with said outlet, said valve body being provided with a stationary valve seat for said second passage, a pilot valve cooperating with said stationary seat for said second passage for controlling the flow of fluid through said second fluid passage, means for resiliently connecting said main and pilot valves in such a direction to urge both toward their respective open positions, and means for varying the opening of said pilot valve for varying the opening of said main valve.

7. A modulating valve including a valve body having an inlet and an outlet, a fluid motor having a substantially closed chamber with a restricted fluid passage connecting with said inlet and located within said valve body, said valve body having a valve seat between said inlet and outlet, a main valve connected to said fluid motor and cooperating with said valve seat to control the flow of fluid from said inlet to said outlet, a second fluid passage of lesser restriction connecting said closed chamber with said outlet, said valve body being provided with a stationary valve seat for said second passage, a pilot valve cooperating with said stationary seat for said second passage for controlling the flow of fluid through said second fluid passage, means for resiliently connecting said main and pilot valves in such a direction to urge both toward their respective closed positions, and means for varying the opening of said pilot valve for varying the opening of said main valve.

References Cited in the file of this patent

UNITED STATES PATENTS

| | | |
|---|---|---|
| 2,496,553 | Littlefield | Feb. 7, 1950 |
| 2,657,673 | Littlefield | Nov. 3, 1953 |